(12) United States Patent
Uehara et al.

(10) Patent No.: US 8,684,804 B2
(45) Date of Patent: *Apr. 1, 2014

(54) PHOTOGRAPHING DEVICE HAVING GAME FUNCTION, AND METHOD OF EXECUTING GAME

(75) Inventors: Hiroyasu Uehara, Saitama (JP); Shigenori Fujio, Saitama (JP)

(73) Assignee: Pentax Ricoh Imaging Company, Ltd., Tokyo (JP)

( * ) Notice: Subject to any disclaimer, the term of this patent is extended or adjusted under 35 U.S.C. 154(b) by 133 days.

This patent is subject to a terminal disclaimer.

(21) Appl. No.: 13/225,781

(22) Filed: Sep. 6, 2011

(65) Prior Publication Data
US 2012/0057008 A1 Mar. 8, 2012

(30) Foreign Application Priority Data
Sep. 7, 2010 (JP) .................................. 2010-200391

(51) Int. Cl.
*A63F 9/24* (2006.01)
*A63F 13/00* (2006.01)

(52) U.S. Cl.
USPC .............. 463/1; 463/31; 463/43; 396/207; 396/210; 396/211; 396/310; 396/311; 700/92

(58) Field of Classification Search
USPC ........... 463/1, 43, 31; 369/207; 396/207, 210, 396/211, 310, 311; 700/92
See application file for complete search history.

(56) References Cited

U.S. PATENT DOCUMENTS

| 2003/0134679 | A1* | 7/2003 | Siegel et al. ..................... 463/43 |
| 2008/0058101 | A1* | 3/2008 | Hato ............................... 463/35 |
| 2008/0235093 | A1* | 9/2008 | Uland .............................. 705/14 |
| 2009/0040329 | A1  | 2/2009 | Uehara et al. |

FOREIGN PATENT DOCUMENTS

JP 2928829 * 5/1999

OTHER PUBLICATIONS

U.S. Appl. No. 12/225,875 to Uehara et al., filed Sep. 6, 2011.

* cited by examiner

*Primary Examiner* — Arthur O Hall
*Assistant Examiner* — Jasson Yoo
(74) *Attorney, Agent, or Firm* — Greenblum & Bernstein, P.L.C.

(57) ABSTRACT

A photographing device having a game function which determines win/loss of photographing devices based on information regarding image files, is provided with a first parameter obtaining unit configured to obtain a first parameter regarding a first image file which was generated by the photographing device, a second parameter obtaining unit configured to obtain a second parameter regarding a second image file which is stored in another photographing device, a score calculating unit configured to calculate scores regarding the first image file and the second image file based on the first parameter and the second parameter, respectively, a win/loss determining unit configured to determine win/loss of the photographing device and the other photographing device, and generate win/loss information, a recording unit configured to store the win/loss information, in accumulated manner, as intrinsic information which is intrinsic to the photographing device, and a notifying unit configured to output the accumulated win/loss information.

15 Claims, 12 Drawing Sheets

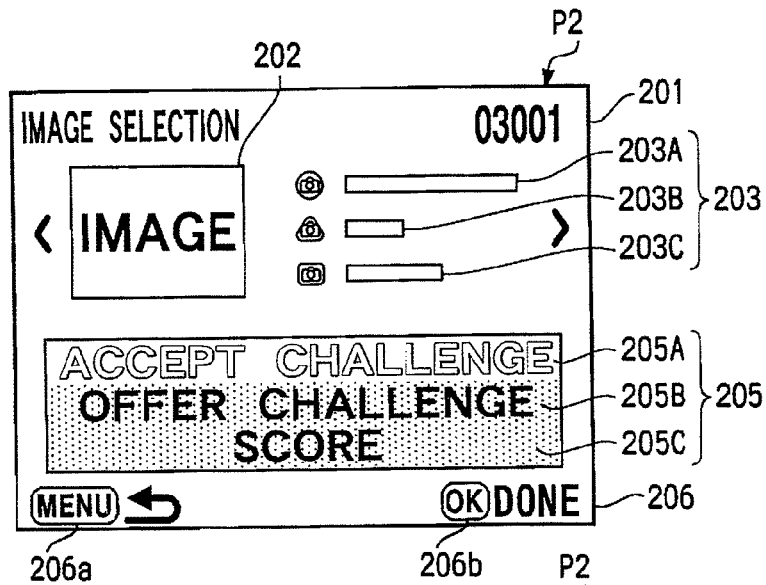
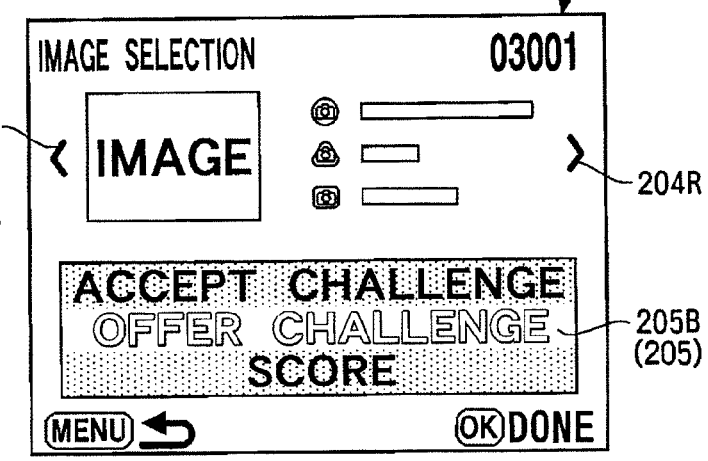
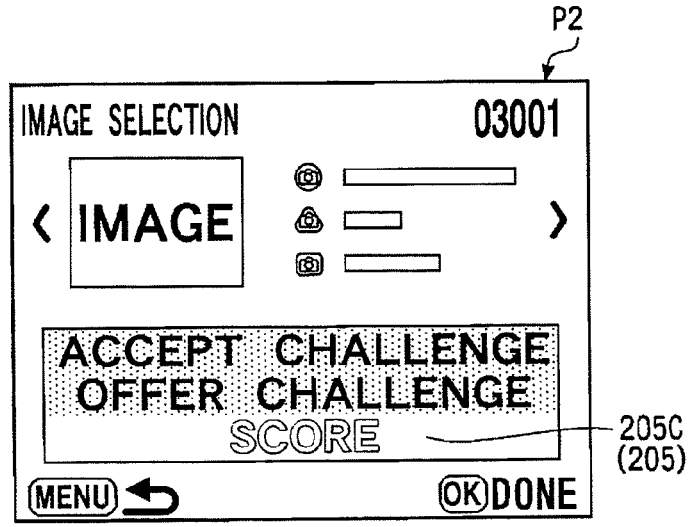

PHOTOGRAPHING DEVICE HAVING GAME FUNCTION, AND METHOD OF EXECUTING GAME

TECHNICAL FIELD

Aspects of the present invention relate to a photographing device having a game function, and a method of executing a game.

BACKGROUND

A camera is one of the most taste-dependent industrial products. Users may have a sense of superiority in having a superior camera. Further, it is important that the camera causes the users to have attachment, or passion thereto. For this purpose, camera manufactures try to improve performance and/or functionality of the camera, and further try to amplify attachment of the user to the camera by means of design, advertisement and the like.

Further, in accordance with improvement in computerization and/or digitization, different kinds of electronic devices having different functions can be combined or merged so that a single electronic device has a plurality of functions. Typically, it is know that a cell phone or a mobile game machine is provided with a digital camera function (i.e., a photographing function). In accordance with such a merger of different types of information processing devices with the digital camera function, various ways of using the digital camera function have been suggested.

One of applications using the digital camera function is a battle game, an example of which is disclosed in Japanese Patent Publication No. 2928829. The game uses two mobile gaming machines each provided with digital camera function. The two mobile machines are interconnected through a communication cable. When the game starts, an image is captured by each camera and an image file is generated. The image files are exchanged, and converted to a value in accordance with a predetermined algorithm. By comparing the converted values, a winner and a loser are determined. Since the images captured by the users are used in such a game, the winner may feel superiority since the image he/she captured is converted to a higher value than the other. Further, using the mobile machines in such a way, the users may have emotional attachment for the images he/she captured.

SUMMARY

In the above described game, specification or attribution of the gaming machine does not directly contribute to the results of the game. Therefore, even if a user wins the game, he/she may not have emotional attachment to the gaming machine, or may not feel superiority in having such a gaming machine.

In consideration of the above, aspects of the invention provided an improved photographing device having a gaming function, and a method of executing a game. The user would have the emotional attachment to the photographing device as he/she plays the game implemented to the photographing device through the game.

According to aspects of the invention, there is provided a photographing device having a game function which determines win/loss of photographing devices based on information regarding image files, which includes a first parameter obtaining unit configured to obtain a first parameter regarding a first image file which was generated by the photographing device, a second parameter obtaining unit configured to obtain a second parameter regarding a second image file which is stored in an other device, a score calculating unit configured to calculate scores regarding the first image file and the second image file based on the first parameter and the second parameter, respectively, a win/loss determining unit configured to determine win/loss of the photographing device and a second photographing device that generated the second image file, and generate win/loss information, a recording unit configured to store the win/loss information, in accumulated manner, as intrinsic information which is intrinsic to the photographing device, and a notifying unit configured to output the accumulated win/loss information.

According to aspects of the invention, there is provided a photographing device having a game function which determines win/loss of photographing devices based on information regarding image files, which includes a parameter transmitting unit configured to transmit a first parameter regarding a first image file which was generated by the photographing device, an image file receiving unit configured to receive a second image file which is stored in an other device, a win/loss information receiving unit configured to receive win/loss information representing win/loss of the photographing device with respect to a second photographing device that generated the second image file, the win/loss information being determined by and transmitted from the other device, a recording unit configured to store the win/loss information, in accumulated manner, as intrinsic information which is intrinsic to the photographing device, and a notifying unit configured to output the accumulated win/loss information.

According to further aspects of the invention, there is provided a method of executing a game to determine win/loss of a plurality of photographing devices based on image files generated by the photographing devices, which has the steps of collecting parameters of image files respectively designated by the plurality of photographing device, exchanging the image data of the image files designated by the plurality of photographing devices among the plurality of photographing devices, determining win/loss of the image files based on the collected parameters, and increasing a number of wins for the photographing device that generated the image file determined to win, while increasing a number of losses for the photographing device that generated the image file determined to lose. Each of the photographing devices records the numbers of win/loss in an accumulated manner.

BRIEF DESCRIPTION OF THE ACCOMPANYING DRAWINGS

FIGS. 8A-8C show examples of a main screen shown in the display module of the camera.

DETAILED DESCRIPTION OF THE EMBODIMENT

Hereinafter, a digital SLR (single lens reflex) camera 1 according to aspects of the invention will be described with reference to the accompanying drawings.

Camera Function

Figure 1:
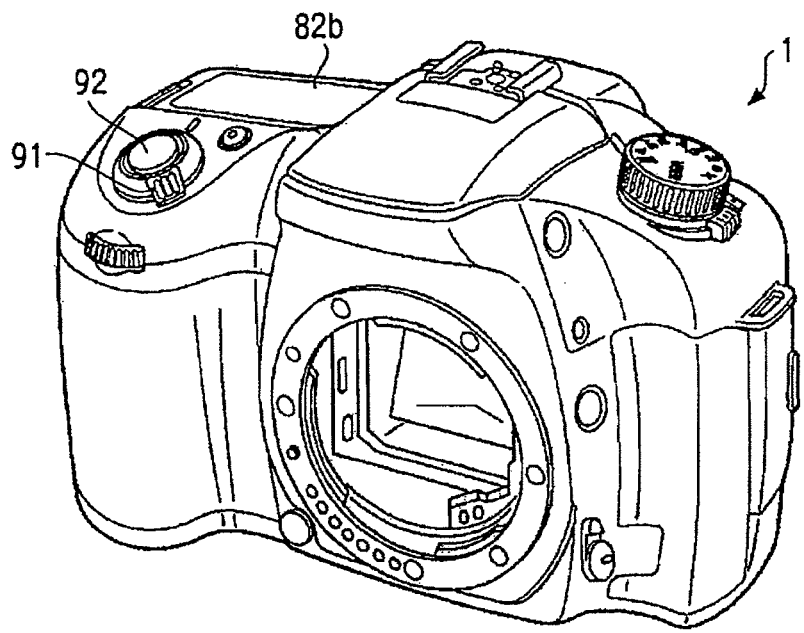
FIG. 1 is a perspective front view of a camera according to an embodiment of the present invention.
Figure 2:
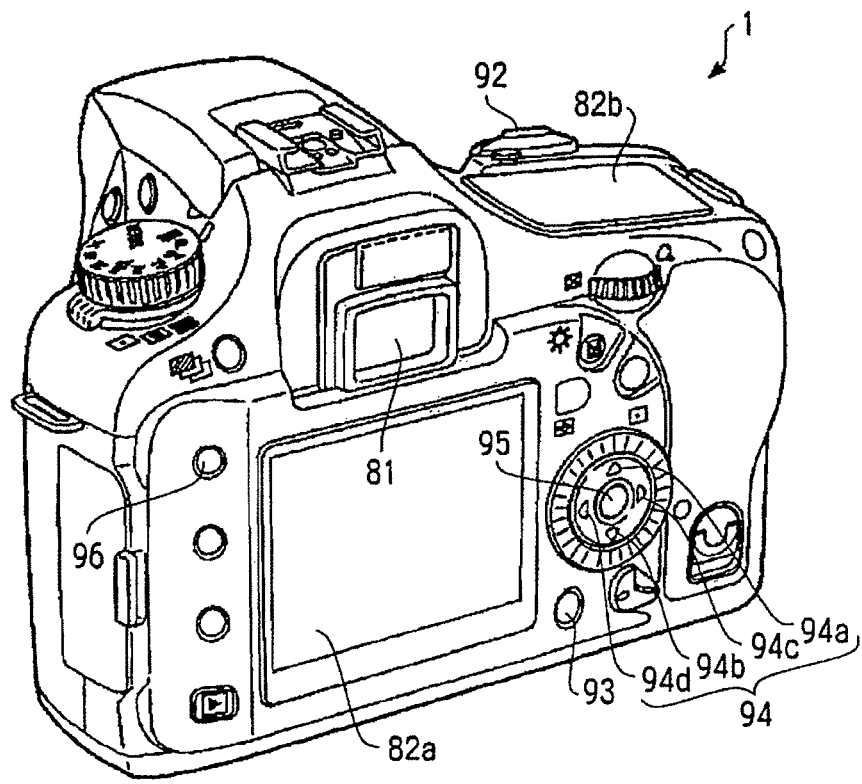
FIG. 2 is a perspective rear view of the camera according to the embodiment of the present invention.
Figure 3:
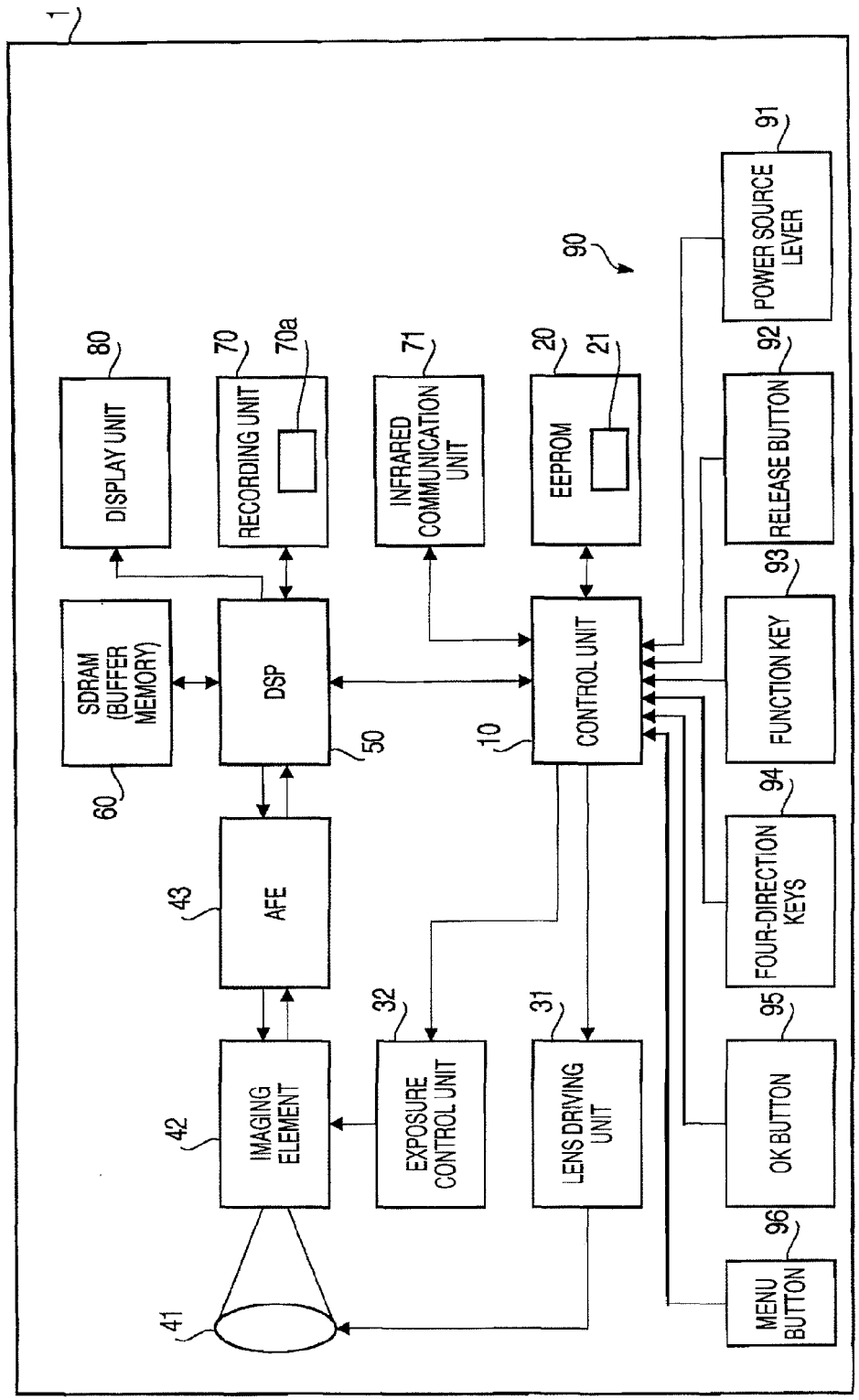
FIG. 3 is a block diagram of the camera showing a functional configuration thereof according to the embodiment of the present invention.

FIG. 1 is a perspective front view of the camera 1 showing a front side thereof, and FIG. 2 is a perspective rear view of the camera 1 showing a rear side thereof. FIG. 3 is a block diagram of the camera 1 showing a functional configuration thereof.

The camera 1 has, as units related to photographing, a control unit 10, an EEPROM (Electrically Erasable Programmable Read Only Memory) 20, a lens driving unit 31, an exposure control unit 32, a lens 41, an image capturing element 42, an AFE (Analogue Front End) 43, a DSP (Digital Signal Processor) 50, an SDRAM (Synchronous Dynamic ROM) 60, a recording unit 70, a display unit 80 and an operation unit 90.

The control unit 10 controls an entire operation of the camera 1 in accordance with programs and setting parameters stored in the EEPROM 20.

The EEPROM 20 also stores initial setting data which has been set by a manufacturer of the camera 1, and variable setting data which may be varied by the user who operates the operation unit 90. The EEPROM 20 also stores a game program 21 which, when executed by the control unit 10, causes the camera 1 to operate as a gaming machine of a photographing game.

The lens driving unit 31 drives the lens 41 to move based on a control signal transmitted by the control unit 10 for focusing and distance-measuring. The exposure control unit 32 controls a shutter and diaphragms to adjust exposure conditions.

The lens 41 is a well-known optical lens (having one or more optical elements) and converges light from an object on an image receiving surface of the image capturing element 42.

The image capturing element 42 is a solid-state element having a plurality of photoelectric converting elements which are two-dimensionally arranged on a substrate. The optical image formed on the image receiving surface, where the plurality of photoelectric converting elements are arranged, is converted to an electrical signal (i.e., analogue image signal). According to the embodiment, a CMOS (Complementary Metal Oxide Semiconductor) image sensor is employed as the image capturing element 42. It is noted that such a configuration is merely an example of possible configurations, and, for example, a CCD (Charge-Coupled Device) image sensor may be used instead of the CMOS image sensor as the image capturing element 42. The analogue image signal generated by the image capturing element 42 is converted to a digital image signal by the AFE 43.

The DSP 50 is an image signal processing circuit. The DSP 50 applies various image processing operations to the digital image signal output by the AFE 43 in accordance with operational conditions (e.g., image processing parameters) set by a user in advance. Then, the DSP 50 outputs an image file having a predetermined file format (e.g., JPEG file format). If the JPEG file is generated, the DSP 50 stores image processing parameters used for image processing in the image file in accordance with the DCF (Design rule for Camera File system) standard.

An SDRAM 60 is a buffer memory that temporarily stores the image data to be processed by the DSP 50. A recording unit 70 stores the image files output by the DSP 50. For the recording unit 70, a rewritable non-volatile memory such as a flash memory is employed. A wireless communication unit 71 executes an infrared light communication in compliance with the IrSimple standard. With the wireless communication unit 71, the camera 1 can exchange various types of data, including the image data, with external devices such as cell phones and SLR cameras in compliance with the IrSimple standard.

The display unit 80 serves as a display system which displays various types of information regarding setting/operational conditions of the camera 1, object images, reproduced images based on image data, information regarding additional functions such as gaming functions. The display unit 80 includes an optical finder 81, a first display unit 82a and a second display unit 82b (see FIG. 2).

The optical finder 81 enables the user to observe the object to be photographed. Specifically, an image identical to the image formed on the image receiving surface of the image capturing element 42 is converged on a retina of the user. In addition, according to the embodiment, various types of information such as the focusing/exposure states/parameters and other parameters are also displayed within the optical finder 81 in an overlapped manner. Therefore, the user can observe the object and confirm the conditions for photographing simultaneously.

The first display unit 82a is provided on a rear surface of the camera 1. The first display unit 82a is configured to display a photographed image, a still image (i.e., an optical image currently formed on the image capturing element 42) for previewing, and information regarding settings of image processing.

The second display unit 82b is provided on an upper surface of the camera 1. The second display unit 82b is configured to display functional setting states regarding image processing such as exposure condition and white balance, and photographing.

The operation unit 90 acquires an input operation by the user. As shown in FIGS. 1-3, the operation unit 90 is provided with a power lever 91, a release button 92, a function key 93, four-direction keys 94 (94a, 94b, 94c and 94d), an OK button 95 and a MENU button 96.

When the release button 92 is fully depressed and a release switch is turned ON, an object image formed, by the lens 41, on the image receiving surface of the image capturing element 42 is captured. The captured image (still image) is converted from the analogue signal to the digital signal by the AFE 43. After the various image processing operations are applied, by the DSP 50, to the digital signal output by the AFE 43, the first display unit 82a displays the object image. The image data of the captured image is converted to a data file having a predetermined format, which is set by the user, and stored in the recording unit 70. Further, part of the light passed through the lens 41 is diverged by a mirror (not shown) arranged on an upstream side of the image capturing element 42, and is converged on the retina of the user through the optical finder 81.

By locating a power lever 91 at a preview position (not shown), the optical image formed on the image capturing element 42 is captured, and the image data (RAW image)

output by the image capturing element 42 is temporarily stored in the SDRAM 60. In this case, data of the captured image is not stored in the recording unit 70. It is noted that the RAW image temporarily stored in the SDRAM 60 can be stored in the recording unit 70 after development. The RAW image temporarily stored in the SDRAM 60 is used for displaying a preview image. The RAW image is also used as a confirming image when the image processing parameters are set.

The power lever 91 is arranged to revolve around the release button 92 which is provided at a front grip portion of the camera 1. The power lever 91 can be revolved by a forefinger of the user when the user grips the camera 1. The power lever 91 is configured such that an indicator of the lever is slightly hooked at predetermined positions (i.e., an ON position, an OFF position and a Preview Position). By locating the indicator at the ON and OFF positions, the power of the camera 1 is turned ON and OFF, respectively. When the indicator of the power lever 41 is located at the Preview position, a preview display operation (i.e., to capture an image of the object and temporarily store the RAW image in the DRAM 60) is executed.

The release button 92 is used for focusing and photographing. Specifically, when the release button 92 is depressed halfway, a photometry switch is turned ON and a photometry operation by the exposure unit 47 and a focusing operation by the lens driving unit 45 are executed. When the release button 92 is fully depressed, the release switch is turned ON and the photographing operation is executed. The image data generated by the photographing operation is displayed on the first display unit 82a and stored in the recording unit 70. The image captured as the release button 92 is fully depressed may be a still image or a moving image.

The function key 93, the four-direction keys 94 (94a, 94b, 94c and 94d), and the OK button 95 are operation keys (buttons) which are used when the user inputs various setting values. For example, the user can set the parameters of the image processing executed by the DSP 50 with these keys (buttons). The Menu button 96 is arranged on an upper-left side of the first display unit 82a. The MENU button 96 enables the user to select various functions implemented to the camera 1. According to the embodiment, the above keys (buttons) are used also for operating a photographing game which will be described later.

The function key 93 is arranged on the rear surface of the camera 1, at a lower right position. The four-direction keys 94 include an UP key 94a, a DOWN key 94b, a RIGHT key 94c and a LEFT key 94d. The four-direction keys 94 are arranged to surround the OK button 95, and arranged on a right side on the rear surface of the camera 1. When the camera 1 is in the normal photographing mode, if the function key 93 is depressed once, a function setting screen is displayed on the first display unit 82a. Further, if the OK button 95 is depressed in this state, an image processing parameter setting screen is displayed on the first display unit 82a. Through the image processing parameter setting screen, parameters for saturation, hue, contrast and sharpness can be set. Specifically, by operating the four-direction keys 94, the parameters can be changed.

The OK button 95 is used to switch the function setting screen to the image processing parameter setting screen, and to fix the setting of the image processing parameter made by the user. Specifically, when the image processing parameter setting screen is displayed and if the OK button 95 is depressed, the currently displayed parameters are fixed, the image processing parameter setting screen is extinguished, and the operation mode is switched to the normal photographing mode. If image processing parameters have been changed, the changed image processing parameters are overwritten in the EEPROM 20.

Game Function

Next, the photographing game implemented to the camera 1 will be described in detail. The photographing game is a game done by two players respectively having cameras 1. Between the two cameras 1, intrinsic information (e.g., profile information), and image processing parameters and thumbnail images captured by the cameras 1 are exchanged with use of the infrared light communication. Then, a score is calculated, in accordance with a predetermined algorithm, based on the profile information and image processing parameters, and winner/loser are determined based on the score.

Initially, a score calculating algorithm will be described. According to the photographing game, a random number generated in accordance with a normal distribution is regarded as a base point. Then, to the base point, a bonus addition and/or a penalty subtraction are applied to obtain the final score.

An average of the normal random numbers that give the basic points is determined based on the total number of the photographed images of each camera 1 when the image file used for the photographing game is taken. Therefore, a camera that has been used by the user for a long period is expected to have a high basic score, and therefore, the camera 1 used for a long period may have a higher winning ratio. According to the embodiment, a standard deviation that represents uncertainty of the basic score is determined based on one of the image processing parameters (e.g., the saturation, hue and contrast) which are used when the image file used in the photographing game is generated. In addition, the photographing game is performed such that a plurality of matches are performed with changing the image processing parameters to be referred to for calculating the scoring point, and the player having a larger number of wins is determined as a winner.

Specifically, the match is performed three times for the image processing parameters of saturation, hew and contrast, respectively. According to the embodiment, the user can determine the order of the image processing parameters to be referred to arbitrarily. For example, "user A" may select (1) saturation, (2) hue and (3) contrast, in this order, while "user B" may select (1) hue, (2) saturation and (3) contrast, in this order. In such a case, for the first match, the score of user A is calculated based on the saturation, while the score of user B is calculated based on the hue. Similarly, for the second match, the score of user A is calculated based on the hue, while the score of the user B is calculated based on the saturation. For the third match, the scores of both users A and B are calculated based on the contrast. If user A wins in the first and second matches and user B wins in the third match, user A is determined to be the winner since user A wins twice and user B wins only once.

As above, the more the user uses the camera 1, the more the user is strengthened in the photographing game. Therefore, motivation of the user to use the camera 1 is amplified by the user's demand to win the photographing game. Further, the user who has used the camera 1 frequently and has a higher probability in winning the game may feel proud of having such a high probability in winning the game and may have stronger attachment for the camera 1. It is noted that, not only the experiential value (the total number of photographed images) but also the uncertain factor based on the image processing parameters, the user can enjoy the game even if the number of the photographed images is relatively small. Further, the manufacturer may provide users with enjoyable experience by configuring the game to have attractive functions and/or give bonus points when a predetermined setting is used for photographing.

Next, calculation of the basic sore will be described specifically. As described above, the average of the normal distribution that gives the basic score is determined based on the total number of photographed images. However, if the game is configured such that the strength merely increases in proportion to the total number of photographed images, a growth (i.e., change of the strength) is monotonous and the user may have bored feeling. According to the embodiment, to avoid such a situation, the average is changed non-linearly with respect to the total number of photographed images in accordance with a growth curve shown in FIG. 4 so that the rate of growth varies depending on the total number of photographed images.

Figure 4:
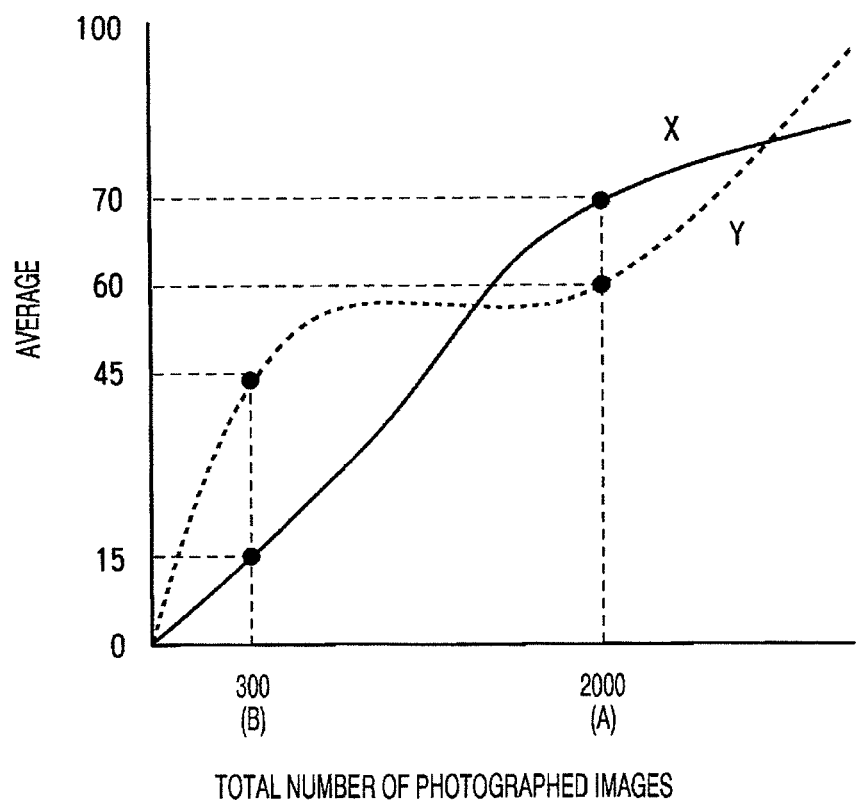
FIG. 4 is a graph showing a growth curve which is used for determining an average value of normal random numbers.

Further, in order to provide individual characteristic in the growth, a plurality of growth curves are selectively used. Specifically, according to the embodiment, two growth tables X and Y as shown in FIG. 4, and ID information (e.g., serial number of the camera 1) are stored in the EEPROM 20. Then, for example, depending on the value of a predetermined number of digit (e.g., n-th digit from the lowest digit) of the serial number, one of the two growth tables X and Y is selected. For example, if the value of the n-th digit is an even number, the growth table X is used, while the growth table Y is used if the value of the n-th digit is an odd number. If the growth table X is applied (see FIG. 4), the growth increases substantially linearly, while the growth table Y is applied (see FIG. 4), the growth increases rapidly at the beginning, slowly in an intermediate period, and rapidly again if the camera 1 is further used. As above, selecting the different growth tables depending on the serial number, individual characteristics may be realized. Such an individual characteristic may amplify the user's attachment for the camera 1.

As described above, according to the embodiment, the game is played with three matches by changing the image processing parameters three times. The growth table to be used may be selected for each match. That is, according to the embodiment, the growth tables are determined based on the serial number and the kind of the image processing parameters to be referred to. Specifically, in the match referring to the saturation, the lowest digit of the serial number is referred to for selecting the growth table (e.g., the growth table X if the lowest digit is an even number and the growth table Y if the lowest digit is an odd number). In the match referring to the hue, the second lowest digit of the serial number is referred to, and in the match referring to the contrast, the third lowest digit of the serial number is referred to. As above, according to the embodiment, by changing the kind of the image processing parameters for three matches, the average value and the normal deviation of the normal random number are changed for each match.

According to the above example, only two growth tables X and Y are used for each kind of image processing parameters. This configuration may be modified such that three pairs of growth tables (X1 and Y1), (X2 and Y2) and (X3 and Y3) may be prepared for the saturation, hue and contrast, respectively. With this configuration, different growth tables are used for different kinds of image processing parameters (i.e., or the saturation, hue and contrast).

As described above, since the growth curves that determine the expectation value of the basic score are switched in accordance with the kind of image processing parameters used for calculating the score, a situation where an almighty player, who is strong regardless of the kind of image processing parameters, appears and deteriorate the interest of the game is prevented. Further, the kind of image processing setting which is advantageous for the game and the kind of image processing setting which is not advantageous for the game vary for individual cameras 1. Therefore, a variety of characters may be provided to the cameras 1. Therefore, the game can be made interesting, and the user's attachment for the camera 1 through the game can be improved.

Next, a process of determining the average value of the normal random numbers based on the growth curve will be described, referring to FIG. 4 and TABLE 1 below. TABLE 1 shows a relationship among the parameters of the camera 1, kinds of growth curves applied for calculation, and the calculated average value. In this example, it is assumed that the game is performed between user A who has a camera A and user B who has a camera B.

TABLE 1

| User | Camera Name | Serial # | Sum | Growth Table Saturation | Hue | Contrast | Average S. | H. | C. |
|---|---|---|---|---|---|---|---|---|---|
| A | A | ZZZZ-364 | 2000 | X | X | Y | 70 | 70 | 60 |
| B | B | ZZZZ-207 | 300 | Y | X | X | 45 | 15 | 15 |

Firstly, based on the serial number of the camera 1 used for the game, the growth table to be used for calculating the score is determined. As shown in FIG. 1, the serial number of camera A is "ZZZZ-364" and the total number of the photographed images after shipped from the manufacturer is 2000, while the serial number of camera B is "ZZZZ-207" and the total number of photographed images after shipped from the manufacturer is 300.

For the match in which the "saturation" is referred to, the growth table X is used if the lowest digit of the serial number is an even number, while the growth table Y is used if the lowest digit of the serial number is an odd number. Since the lowest digit of the serial number of camera A is the even number (4), the growth table X is used for the camera A. The lowest digit of the serial number of camera B is the odd number (7), and the growth table Y is used for the camera B.

For the match in which the "hue" is referred to, the growth table X is used if the second lowest digit of the serial number is an even number, while the growth table Y is used if the second lowest digit of the serial number is an odd number. Since the second lowest digit of the serial number of camera A is the even number (6), the growth table X is used for the camera A. The second lowest digit of the serial number of camera B is the even number (0), and the growth table X is used for the camera B.

For the match in which the "contrast" is referred to, the growth table X is used if the third lowest digit of the serial number is an even number, while the growth table Y is used if the third lowest digit of the serial number is an odd number. Since the third lowest digit of the serial number of camera A is the odd number (3), the growth table Y is used for the camera A. The third lowest digit of the serial number of camera B is the even number (2), and the growth table X is used for the camera B.

Next, the average value of the normal random values to be used for generating the basic score based on the total number of photographed images is determined using the thus determined growth tables.

Regarding the camera A, since the number of photographed images is 2000, the average value is "70" when the growth table X is used (see FIG. 4), and the average value is "60" when the growth table Y is used. Further, as shown in TABLE 1, in the camera A, in the matches using the "saturation", "hue" and "contrast", the growth tables X, Y and X are used, respectively. Therefore, the average values of the normal random numbers for the matches are "70", "70" and "60", respectively.

Regarding the camera B, since the number of photographed images is 300, the average value is "15" when the growth table X is used (see FIG. 4), and the average value is "45" when the growth table Y is used. Further, as shown in TABLE 1, in the camera B, in the matches using the "saturation", "hue" and "contrast", the growth tables Y, X and X are used, respectively. Therefore, the average values of the normal random numbers for the matches are "45", "15" and "15", respectively.

Next, a method of determining the standard deviation of the normal random number to be used for generating the basic score will be described, referring to FIGS. 5A and 5B, and TABLES 2 and 3.

TABLE 2

| File name | Image processing parameters | | |
|---|---|---|---|
| | Saturation | Hue | Contrast |
| File A | +4 | 0 | +2 |
| File B | −4 | +3 | −1 |

TABLE 3

| Parameter value | Standard Deviation | | |
|---|---|---|---|
| | Saturation | Hue | Contrast |
| +4 | 10 | 30 | 10 |
| +3 | 15 | 25 | 15 |
| +2 | 20 | 20 | 20 |
| +1 | 25 | 15 | 25 |
| 0 | 30 | 10 | 30 |
| −1 | 35 | 15 | 35 |
| −2 | 40 | 20 | 40 |
| −3 | 45 | 25 | 45 |
| −4 | 50 | 30 | 50 |

TABLE 2 shows conditions (image processing parameters) used for the image processing when the image files for the game were generated. Specifically, an image file A is the file generated (captured and processed) by the camera A and the user A uses for the game, while an image file B is the file generated (captured and processed) by the camera B and the user B uses for the game.

TABLE 3 is an example of the standard deviation table that gives the standard deviation of the normal random number based on the setting values of the image processing parameters (saturation, hue and contrast) used for generating the image files which are used for the game.

Figure 5A:
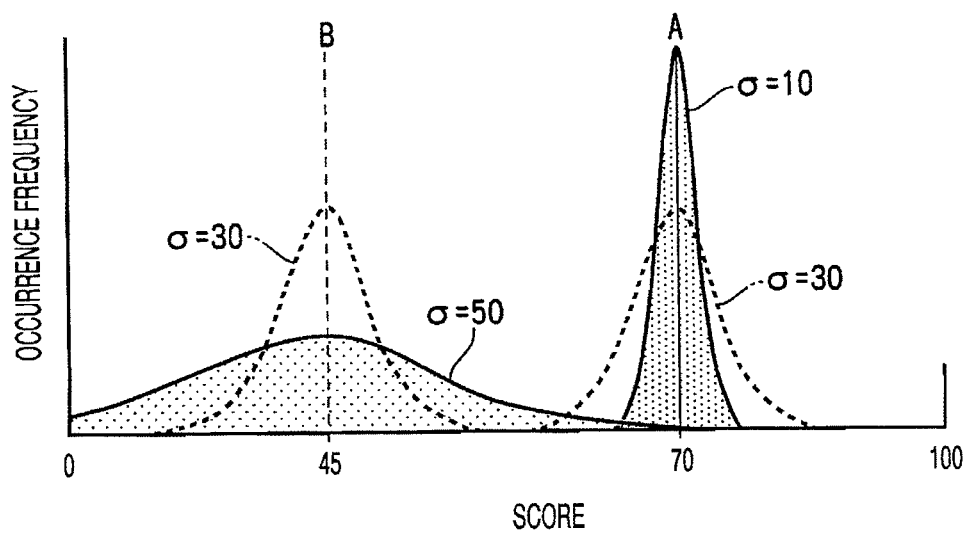
FIG. 5A and FIG. 5B show probability distribution curves illustrating a method of calculating a basic score.
Figure 5B:
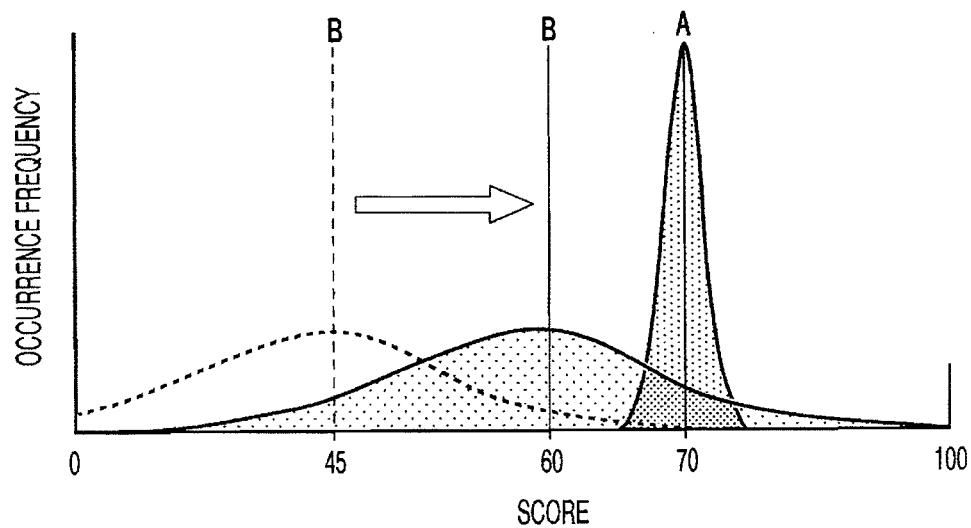

FIGS. 5A and 5B show standard deviation curves which give normal random numbers to be used for determining the average values. In particular, FIGS. 5A and 5B show probability distribution curves A and B of the normal random numbers to be applied to the users A and B, respectively, for calculating the score regarding the "saturation".

When a match is played using the setting values of the "saturation", the standard deviation of the normal random number used for generating the basic score is determined based on the setting values of the "saturation". Specifically, the standard deviation corresponding to the setting values of the "saturation" used for generating the image files for the game can be obtained from TABLE 3. According to the embodiment, standard deviation table is configured such that the larger the setting value of the "saturation" is, the smaller the standard deviation is (i.e., the width of the probability distribution curve is narrower).

According to the camera 1, the "saturation" can be set to one of nine values within a range from −4 to +4 (nine steps). When the setting value of the "saturation" is the smallest (i.e., −4), the standard deviation is maximum (i.e., 50), the standard deviation is the smallest (i.e., 10) when the setting value of the "saturation" is the largest (i.e., 4), and the standard deviation is 30 (standard value) when the "saturation" is zero (standard value).

For the user A, from TABLE 2, it is known that the setting value of the image processing parameter used for generating the image file A used for the game (i.e., "saturation") is +4, and the standard deviation "10" to be applied when the calculation is done in accordance with the "saturation" is obtained from TABLE 3.

For the user B, from TABLE 2, it is known that the setting value of the image processing parameter used for generating the image file B used for the game (i.e., "saturation") is −4, and the standard deviation "50" to be applied when the calculation is done in accordance with the "saturation" is obtained from TABLE 3.

Therefore, for the match where the "saturation" is referred to for calculating the score, the basic score of the user A is given as a normal random number defined by the average value of 70 and the standard deviation of 10. The basic score of the user B is given as a normal random number defined by the average value of 45 and the standard deviation of 50. As shown in FIG. 5A, the probability distribution curve A of the normal random number that gives the basic score of the user A is configured such that a distribution width is narrow and values close to the average value 70 appears frequently, in comparison with the probability distribution curve for the standard deviation of 30 (normal value) which is represented by broken lines on the right-hand side of FIG. 5A. In contrast, the probability distribution curve B of the normal random number which gives the basic score of the user B is configured such that the probability of occurrence of various values are equalized and the distribution spreads in a wide range. Since the difference of the average values is relatively large, if the standard deviation of each user is the normal value of 30 (broken line), it is very difficult to turn the game around. However, if the standard deviation becomes large, the game may be turned around easily. On the other hand, if the standard deviation is small, even if the difference of the scores between the users A and B is small, it is difficult to turn the game around.

According to the embodiment, the setting values of the "hue" and the "contrast" can also be set, similar to the setting value of the "saturation", to a value within a range from −4 to +4 (nine steps), and the standard deviation corresponding to the setting values of respective processing parameters can be derived from TABLE 3. According to the embodiment, the standard deviation table for the "hue" is configured such that the larger the setting value (absolute value) of the "hue" is, the larger the standard deviation is. Regarding the "contrast", the larger the setting value of the "contrast" is, the larger the standard deviation is.

The standard deviation table shown in TABLE 3 is configured that the standard deviation changes linearly with respect to the change of the setting value of the image processing parameters. However, such a configuration is only an example and can be modified in various ways. For example, the standard deviation may change gently around standard setting value (zero) of the image processing parameter, and change non-linearly (e.g., change larger for the image processing parameter having a larger value).

According to the embodiment, the normal random number is generated in accordance with the normal distribution defined by the average value and the standard deviation determined as above, and the generated random number is used as the basic score. To the thus obtained basic score, bonus addition (or penalty subtraction) is done in accordance with the setting of the camera 1 and/or the photographing conditions to calculate the final score.

FIG. 5B shows the probability distribution curve of the final scores for the users A and B when a bonus addition of +15 points are added only to the user B. As shown in FIG. 5B, the score distribution of the user B shifts closer to that of the user A, and the possibility that the user B turns around the game further increase with this shift. It is noted that the final score may be less than the basic score due to the penalty subtraction.

The bonus score can be set to be added for various camera settings and/or usage conditions. Some examples of the bonus score will be listed hereafter. It is noted that the bonus score is not limited to the below-listed items. Further, it is not necessary that all the below-listed items are included when the bonus score is calculated. Further, based on the total number of photographed images or other conditions, the kind of bonus score to be applied may be increased/reduced. Optionally, depending on the demographic of the camera 1, the criteria of adding/subtracting the score may be varied. It is noted that the camera 1 according to the embodiment is designed for usage mainly by beginners, and the criteria of the bonus described below is also set assuming that the game is performed by the beginners.

<Bonus Related to Photographing Condition>

A bonus can be set depending on the condition when the image used of the game is photographed.

Night Photograph Bonus: When the date of photographed is within a night period which is defined as a period from the sunset to the sunrise, a night bonus is given. With this bonus, a positive challenge of the user to photograph in the night period in which photographing is relatively difficult is promoted. It should be noted that the camera 1 has a calendar table having the time of the sunrise and sunset for everyday. Further, the camera 1 has a well-known GPS unit (not shown), and location information is obtained when the photographing is done and included in the image file as meta-information. Based on the time information and location information included in the image file, whether the photographing was done in the night period is judged. Alternatively, without taking the difference in location where the image was photographed, that is, without using the calendar table, the night period may be simply defined as a time period between 6:00 p.m. to 6:00 a.m.

Strobe Setting Bonus: The camera 1 is operable in a "manual strobe" setting mode which allows a user to set ON/OFF of the strobe manually, and an "automatic strobe" setting mode in which the ON/OFF setting of the strobe is automatically set based on the photographing condition. According to the embodiment, if the automatic strobe setting mode was set, which ensures photographing of high-quality image, a bonus is given.

Focus Setting Bonus: The camera 1 is operable in a MF (manual focusing) mode in which the user manually operates the lens to focus on the object, and the AF (automatic focusing) mode in which the camera 1 automatically focuses on the object. According to the embodiment, if the MF mode is selected, which improves the photographing technique of the user, a bonus is given.

Shutter Speed Bonus: For a slower shutter speed (i.e., longer exposure period), a higher bonus is given.

Stop Setting Bonus: For a higher setting of the stop (i.e., for a smaller aperture setting), a higher bonus is given.

ISO Sensitivity Bonus: For the smaller value of the ISO setting, a higher bonus is given.

Exposure Compensation Bonus: If the setting of the exposure correction when the photographing is done is plus, a bonus is given, while if the exposure correction is minus, a penalty is given (i.e., the score is decreased).

Photometry Method Bonus: According to the embodiment, the camera 1 is operable to use a divided photometry method in which an image area is divided into a plurality of subareas and photometry is performed for each of the subareas, a central photometry method in which the brightness of the central portion of the image area is given a higher weight, while measuring the entire brightness, and a spot photometry method in which the photometry is done with respect to a predetermined central area of the image area. According to the embodiment, when the spot photometry method is used for photographing, a bonus is given.

Photometry Result Bonus: For a higher value of the exposure value (EV value) calculated based on the result of the photometry (i.e., for a darker object), a higher bonus is given.

White Balance Bonus: If the camera is set to manually adjust a white balance, a bonus is given.

Focal Length Bonus: For a longer focal length, a higher bonus is given.

Exposure Setting Bonus: If the exposure mode when the photographing is done is a mode other than a full automatic exposure mode (P mode), a bonus is given.

Continuous Shoot Bonus: If the photographing is done in the continuous shooting mode, a bonus is given.

Lens Bonus: According to the embodiment, a lens identifying system that identifies the type of the implemented lens is provided, and a period during which each lens is attached to the camera 1 is recorded in the recording unit 70. Therefore, based on the periods recorded in the recording unit 70 and the date/time of photographing, a lens used for photographing each image can be identified. If the lens used for photographing the image is a recommended lens, a bonus is given.

Inside Temperature Bonus: The camera 1 is provided with a temperature sensor measuring a temperature inside the camera 1, and the temperature when photographing is done is stored in the recording unit 70. For a higher inside temperature at the time of photographing, a higher bonus is given.

AE Lock Bonus: The camera 1 according to the embodiment is provided with an AE lock function. If the AE lock function is used at the time of photographing, a bonus is given.

Dynamic Range Enhancement Bonus: If the dynamic range enhancement function is used at the time of photographing, a bonus is given.

High Sensitivity Noise Reduction Bonus: According to the embodiment, the camera 1 has a high-sensitivity noise reduction function which is a function of executing a noise reduction process automatically when the ISO sensitivity is set to a high sensitivity.

Hand Shake Bonus: According to the embodiment, the camera 1 provided with a hand-shake prevention mechanism, and a parameter representing the magnitude of the shake of the camera 1 can be obtained based on control information derived from the hand-shake prevention mechanism. For a smaller value of the parameter representing the shake of the camera 1, a higher bonus is given. It is noted that, if the value of the parameter is smaller than a predetermined threshold value, it is judged that a tripod is used for photographing and no bonus is given.

<Bonus Related To Image Processing Condition>

In addition to the above bonuses, further bonuses related to the image processing condition which are applied for generating the image data for the game are given.

Saturation Setting Bonus: For the setting value of the saturation (for the vivid image), a higher bonus is given.

Hue Setting Bonus: For a larger rotating angle on a hue circle corresponding to the setting value of the hue, a higher bonus is given.

Contrast Setting Bonus: For a larger setting value of the contrast (i.e., for stronger contrast), a higher bonus is given.

KEY Bonus: If the brightness setting is plus, a bonus is given, while the brightness setting is minus, the score is decreased as penalty.

Sharpness Setting Bonus: If the setting value of sharpness is higher, a higher bonus is given.

Fine Sharpness Setting Bonus: If a high sharpness function, which enables fine photographing, is ON, a higher bonus is given.

Color Space Setting Bonus: A recommended color space (e.g., Adobe RGB) is used, a higher bonus is given.

Post-Process Bonus: If the number of applications of image processes such as a digital filter is greater, a higher bonus is given.

Finish Setting Bonus: According to the embodiment, predetermined image processing conditions (sets of image processing parameters), which are referred to as "image finish", optimized to typical photographing scenes or objects are registered in advance. Further, the user can adjust each image processing parameter of the "image finish". If the "image finish" adjusted by the user is used for image processing, a bonus is given.

Cross-Process Bonus: According to the embodiment, the camera 1 has a cross-process function which applies change of hue as if a positive film is developed with a developer for negative films. If the cross-process function is used at the time of photographing, a bonus is given.

Lens Aberration Compensation Bonus: If image processing to compensate for aberration of the lens is applied, a bonus is given.

Encrypt Photographing Bonus: According to the embodiment, the camera 1 is capable of recording photographed images in encrypted manner. For the greater number of photographed images with encryption, a higher bonus is given.

Quality Bonus: According to the embodiment, a quality setting is a setting value representing image quality (image compression ratio) of an image file in accordance with a lossy compression such as JPEG, and the setting value is set within a range from 1 to 4 (four steps). For the higher setting value (i.e., the quality is better if the setting value is higher; that is, the compression ratio is lower if the setting value is higher), a higher bonus is given. To record images with high quality is recommended, the user's photographing technique is promoted.

<Other Bonuses>

For entertainment purpose, the following bonuses are further set.

Lucky ID Bonus: For example, the lower four digits of the serial number of the camera 1 or the serial number of the photographing element are equal to the photographed time (e.g., for example, "2015" which represents 20:15), a bonus is given. For another example, a three-digit random number is generated, and if the lower three digits of the serial number is equal to the random number, a bonus is given.

The parameters used for calculating the bonus score are stored in the recording unit 70 at the time of photographing, or included in the image file as meta-information. Alternatively, the bonuses may be calculated at the time of photographing or image processing and the bonuses are stored in the recording unit 70 or included in the image file as meta-information.

Next, a process of executing the photographing game will be described.

When the user revolves the power lever 91 and move the power lever 91 from the OFF position to the ON position, the camera 1 is powered ON, and the camera 1 is activated in the photographing mode. When the function key 93 is depressed when the camera 1 operates in the photographing mode, a function selection screen P1 (see FIG. 6) is displayed.

The function selection screen P1 includes an icon display area 101 in which icons representing various selectable functions are displayed, a name display area 102 in which a name of the function of the selected icon is displayed, a description area 103 in which explanation of the selected function is displayed, and an operation guide area 104 in which operations assigned to the menu button 96 and the OK button 95 are indicated.

Figure 6:
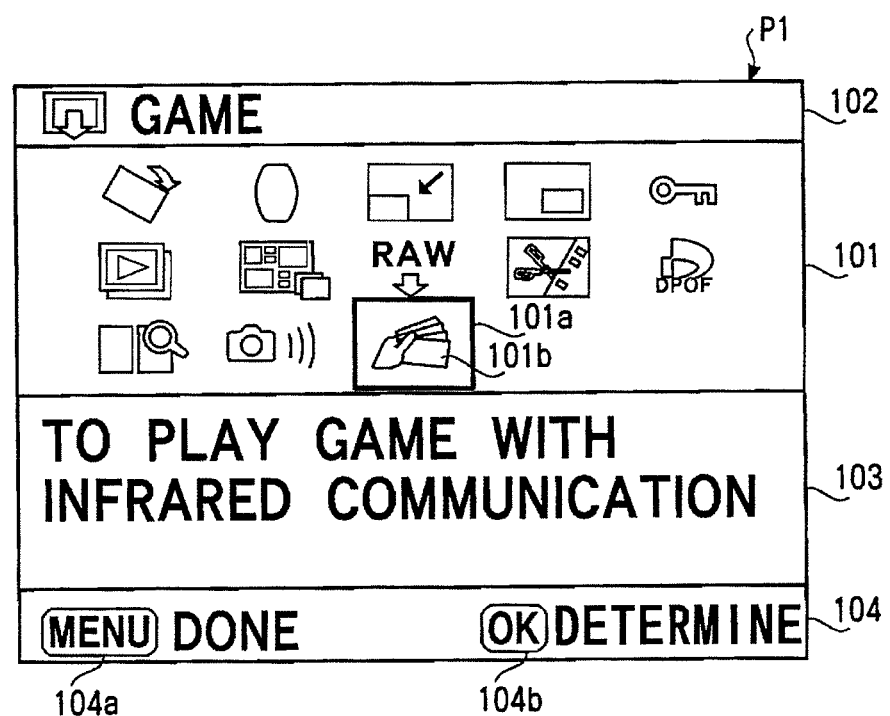
FIG. 6 shows a function selecting screen displayed on a first display unit of the camera according to the embodiment of the invention.

In the icon display area 101, a selection frame 101a which surrounds the currently selected icon is displayed. When the user operates the four-direction keys 94, the selection frame 101a moves to a next icon (i.e., to surround the next icon) in the direction corresponding to the operated one of the four-direction keys 94, and a function being selected is switched. FIG. 6 shows a state where an icon 101b representing the photographing game is selected (i.e., surrounded by the frame 101a). At this stage, in the name display area 102, the name of the game (e.g., photo challenger) is displayed, and a brief description of the game is provided in the description area 103.

In the example shown in FIG. 6, a MENU mark 104a representing the MENU button 96 and an OK mark 104b representing the OK button 95 are displayed. On the right-hand side of the MENU mark 104a, a text "DONE" is displayed to indicate that the function selection screen P1 is extinguished (i.e., function selection is terminated) and switched to a normal display for the photographing mode if the MENU button 96 is depressed. Further, on the right-hand side of the OK mark 104b, a text "DETERMINE" is displayed to indicate that execution of the currently selected function is determined if the OK button 95 is depressed. That is, when the function selection screen P1 is displayed as shown in FIG. 6 and the user depresses the OK button 95 with the icon 101b being selected, a game program 21 for executing the photographing game is started.

Figure 7:
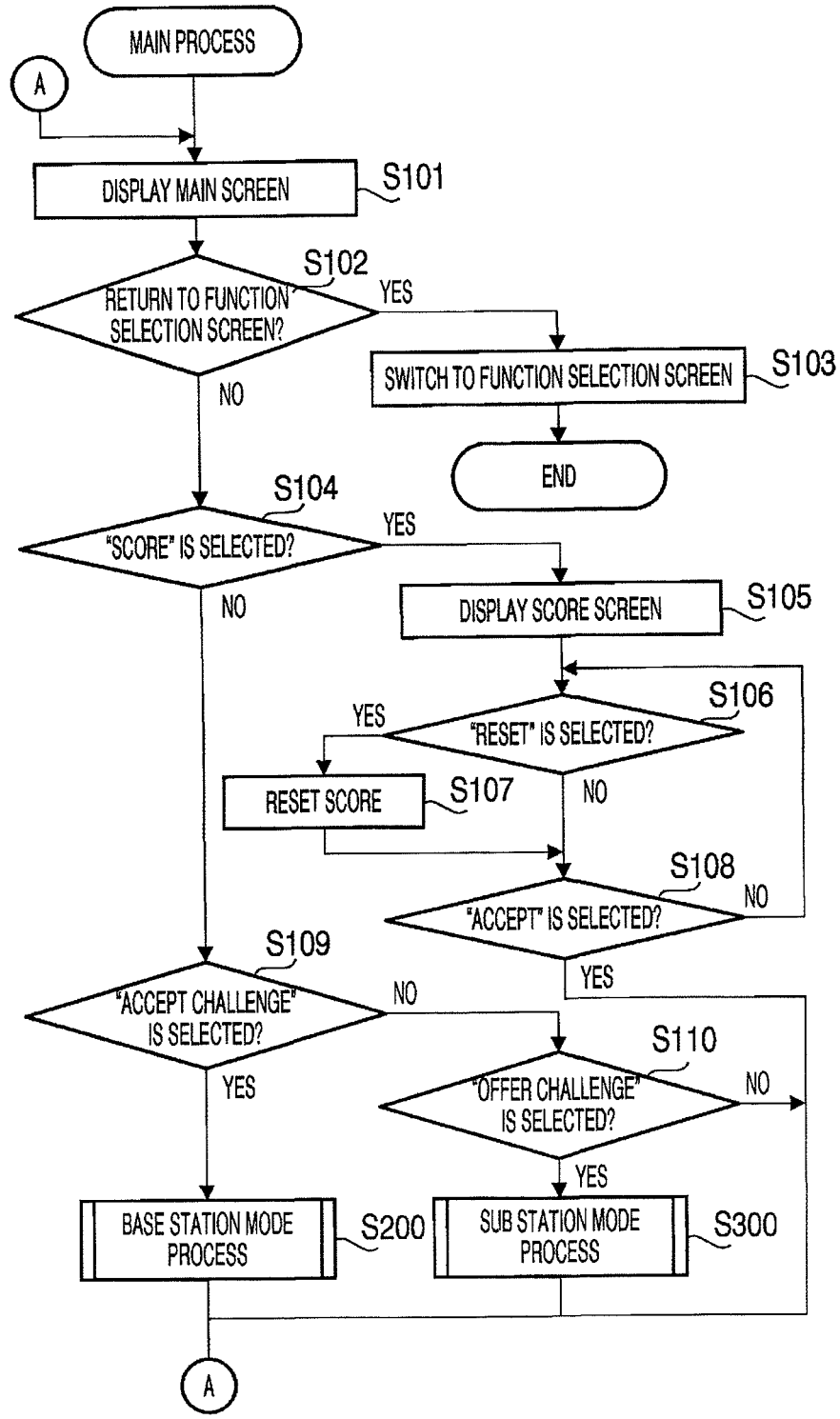
FIG. 7 is a flowchart illustrating a main process of a photographing match according to the aspect of the invention.

FIG. 7 is a flowchart illustrating a main process of the photographing game according to the embodiment of the invention. When the main process is started, a main screen P2 (see FIG. 8A) is displayed on the first display unit 82a (S101). On the main screen P2, there are provided a selected file number display area 201 where a file number of the image file the user has selected to use for the game (hereinafter, the image file is referred to as a selected image file, and the image represented by the image file is referred to as a selected image) is indicated, a selected image display area 202 where a thumbnail image of the selected image is displayed, a parameter display area 203 where the image processing parameters used of generating the selected image file are displayed in the form of bar graph, and change marks 204L and 204R which notify the user that there exist other image files which can be selected for the game, a process selection list display area 205 where a list of processes for user selection is displayed, and an operation guide area 206.

In the parameter display area 203, there are provided a first section 203A where the setting value of the "saturation" used for processing the selected image is indicated with a bar graph, a second section 203B where the setting value of the "hue" is indicated with a bar graph, and a third section 203C where the setting value of the "contrast" is indicated with a bar graph.

The change mark 204L is displayed when there exist one or more image files which can be selected by the user as the selected file and have smaller file numbers. The change mark 204R is displayed when there exist one or more image files which can be selected by the user as the selected file and have greater file numbers. When the change mark 204L and/or 204R are displayed, an image to be selected can be changed as the user operates the left key 94d and/or 94c which correspond to the change marks 204L and 204R, respectively. Specifically, when the user operates the left key 94d, which corresponds to the change mark 204L, the selected image file is changed in the descending order of the file number, while when the user operates the right key 94c, which corresponds to the change mark 204R, the selected image file is changed in the ascending order of the file number. Immediately after the function selection screen P1 is switched to the main screen P2, the image file that was used for the previous photographing game or an image file most recently photographed is automatically set as the selected image file.

In the process selection list display area 205, three selectable processes, "ACCEPT CHALLENGE" (205A), "OFFER CHALLENGE" (205B) and "SCORE" (205C) are indicated. FIG. 8A shows a case where the "ACCEPT CHALLENGE" is highlighted to show that the process is currently selected. If the user operates the up key 94a or the down key 94b, the highlighted process is switched (i.e., the selected process is switched). That is, for example, if the user operates the down key 94b when the "ACCEPT CHALLENGE" (205B) is selected, the selected process is switched to "OFFER CHALLENGE" (205B), which is highlighted as shown in FIG. 8B. If the user further operates the down key 94b, the selected process is switched to "SCORE" (205C), which is highlighted as shown in FIG. 8C. If the user operates the up key 94a, the selected process is switched "SCORE" (205C) to "OFFER CHALLENGE" (205B) as shown in FIG. 8B.

According to the embodiment, the photographing game is played with two cameras, one of which operates as a base station and the other operates as a sub station. The base station offers for challengers (i.e., sub stations) and accept the challenge from the sub station. According to the embodiment, the judgment (win or lose) is made by the base station, and the judgment is transmitted from the base station to the sub station. The process of "ACCEPT CHALLENGE" (205A) is a process that causes the camera 1 to operate as the base station, while the process of "OFFER CHALLENGE" (205B) is a process that cases the camera 1 to operate as the sub station.

In the operational guide area 206, a MENU mark 206a and an OK mark 206b are displayed. On the right-hand side of the MENU mark 206a, a return mark (arrow) is displayed to indicate that the MENU button 96 functions as a return key. If the user depresses the MENU button 96, the screen displayed on the first display unit 82 is switched from the main screen P2 to the previously displayed function selection screen P1 (S103). On the right-hand side of the OK mark 206b, a text "DETERMINE" is displayed to indicate that the currently selected process is executed. That is, when the main screen P2 is displayed, if the user depresses the OK button 95, the currently selected one of the three processes of "ACCEPT CHALLENGE" (205A), "OFFER CHALLENGE" (205B) and "SCORE" (205C) is executed.

Figure 9:
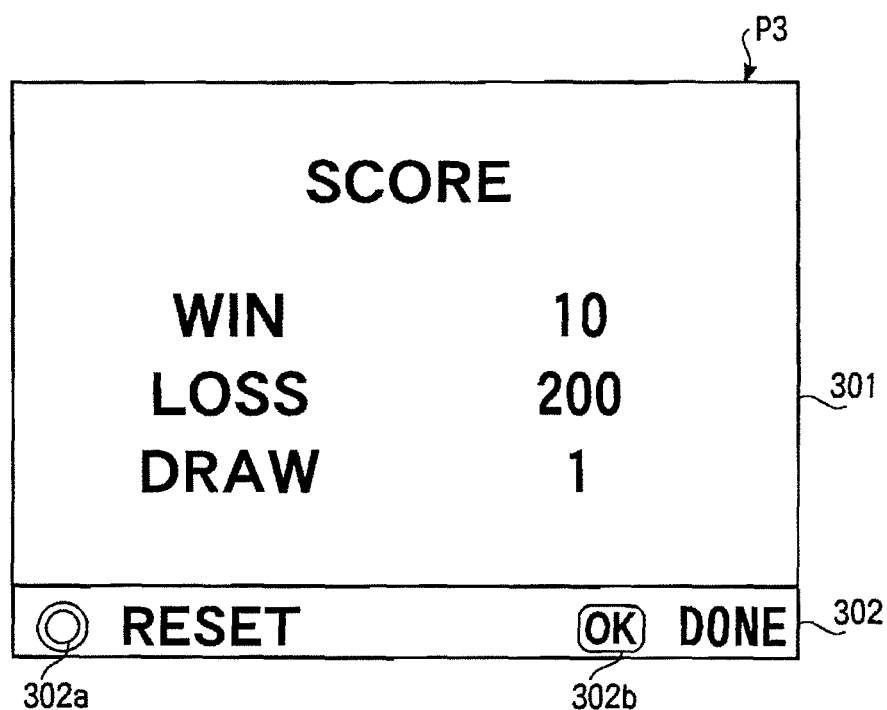
FIG. 9 shows a score screen shown in the display module of the camera.

When the main screen P2 is displayed and the process of "SCORE" (205C) is selected as shown in FIG. 8C, if the user depresses the OK button 95 (S104: YES), a score display screen P3 as shown in FIG. 9 is displayed (S105).

The score display screen P3 has a score display area 301 and an operational guide area 302. In the score display area 301, the score of the games which have been played is displayed. Specifically, as shown in FIG. 9, the numbers of win, lose and draw are indicated in the score display area 301. It is noted that the score as displayed is retrieved from an accumulated data section 70a defined in the recording unit 70.

In the operational guide area 302, a release mark 302a representing the release button 92 and an OK mark 302b representing the OK button 95 are displayed. On the right-hand side of the release mark 302a, a text "RESET" is displayed. If the user depresses the release button 92 when the score display screen P3 is displayed (S106: YES), the score is reset, that is the numbers of win, lose and draw are all set to initial values of zero (S107). On the right-hand side of the OK mark 302b, a text "OK" is displayed. If the OK button 95 is depressed (S108: YES), the main screen P2 is displayed (S101).

When the main screen P1 as shown in FIG. 8A is displayed (i.e., when "ACCEPT CHALLENGE" (205A) is selected), if the user depresses the OK button 95 (S109: YES), the base station mode process which causes the camera 1 to operate as the base station is started (S200), and when the base station mode process is terminated, the main screen P2 is displayed (S101).

When the main screen P1 as shown in FIG. 8B is displayed (i.e., when "OFFER CHALLENGE" (205B) is selected), if the user depresses the OK button 95 (S110: YES), the sub station mode process which causes the camera 1 to operate as the sub station is started (S300), and when the sub station mode process is terminated, the main screen P2 is displayed (S101).

Figure 10:
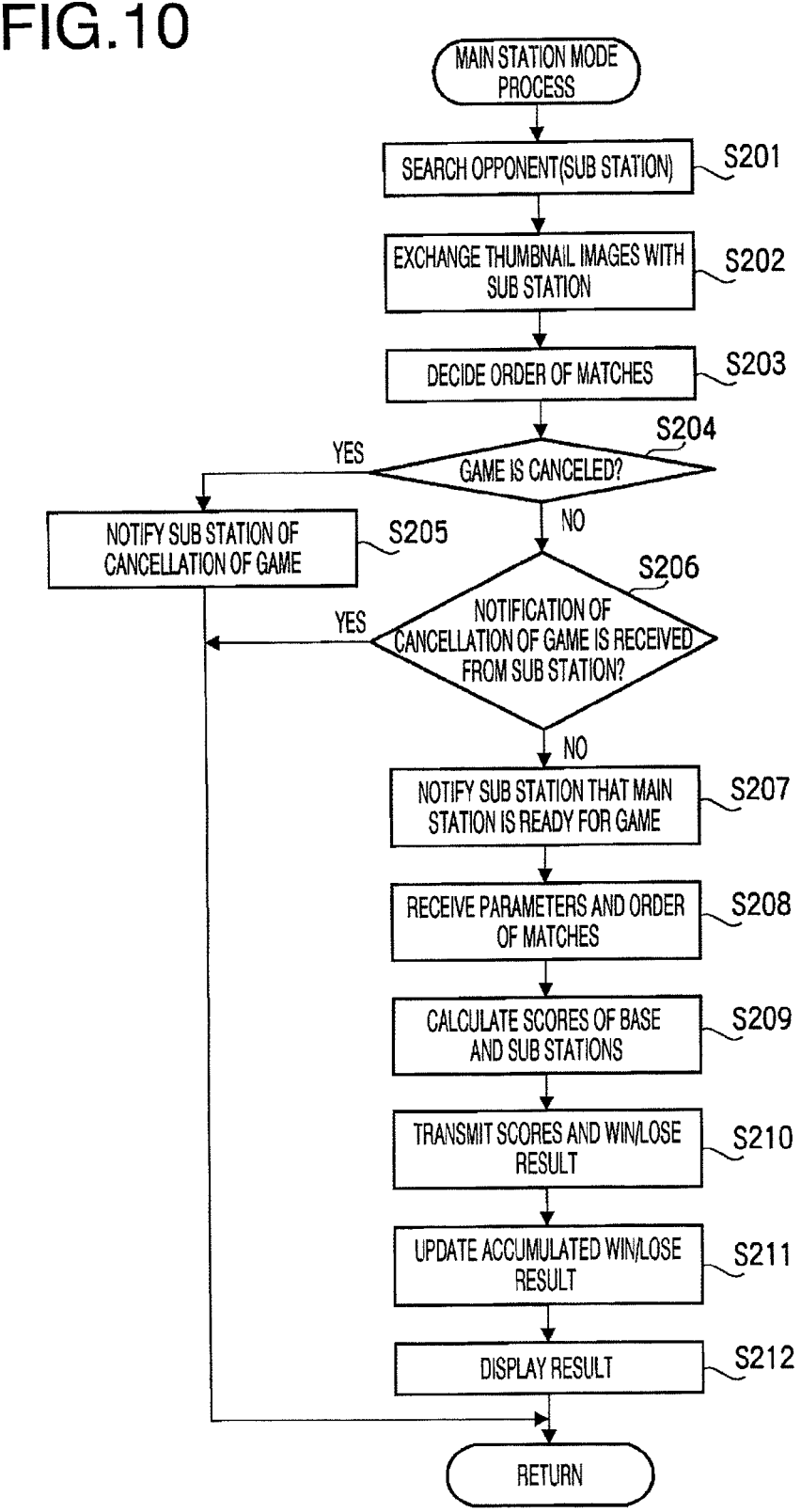
FIG. 10 shows a flowchart illustrating a base station mode process which is called in the main process shown in FIG. 7.

FIG. 10 is a flowchart illustrating the base station mode process which is called in S200 of the main process shown in FIG. 7. In S201, the camera 1 searches another camera 1 that operates in the sub station mode an serves as an opponent with the infrared communication. When the sub station is found, the camera 1 generates a thumbnail image corresponding to the image file selected by the user, and exchange the thumbnail images with the sub station (S202). Then, the camera 1 displays the game preparation screen P4 as shown in FIGS. 11 and 11A-11F, which enables the user to determine the order of three image processing parameters (i.e., saturation, hue and contrast) to be used for the game (S203).

Figure 11:
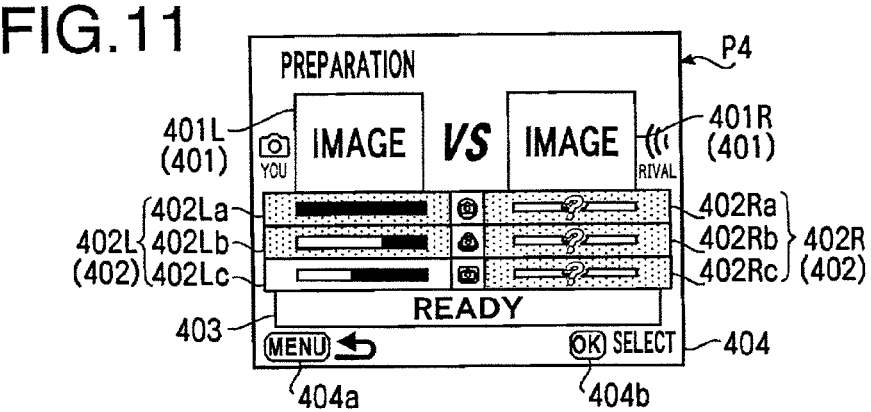
FIG. 11 shows a match preparation screen displayed on the display module of the camera.
Figure 11A:
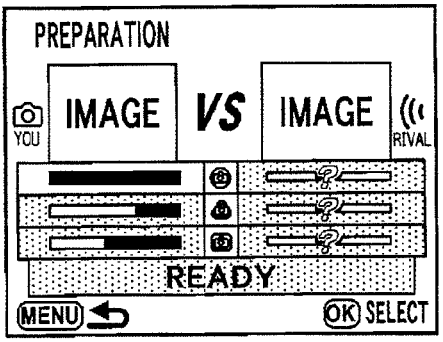
FIGS. 11A-11F show examples of a match preparation screen displayed on the display module of the camera.

The game preparation screen P4 is provided with a selected image display area 401 where thumbnail images of the image files selected by the user and opponent, a parameter display area 402 where the image processing parameters used for generating the images as selected are indicated in the form of bar graph, and an preparation status display area 403 where the an indication of "preparation completed" is indicated when the order of the image processing parameters has been determined and the user is ready to start the game, and an operation guide area 404 as shown in FIG. 11.

The selected image display area 401 is divided into right and left subareas 401R and 401L. In the left subarea 401L, the image selected by the user of the base station is displayed, while in the right subarea 401R, the image selected by the sub station is displayed.

Similarly, the parameter display area 402 is divided into right and left subareas 402R and 402L. In the left subarea 402L, the parameters related to the user-selected image are displayed, while in the right subarea 402R, the parameters related to the opponent-selected image are displayed. Specifically, the subarea 402L includes first, second and third parameter display areas 402La, 402Lb and 402Lc, in which the user setting values of the "saturation", "hue" and "contrast" applied to process the user-selected image are displayed, respectively, in the form of bar graph. The subarea 402R includes first, second and third parameter display areas 402Ra, 402Rb and 402Rc for the "saturation", "hue" and "contrast" applied to process the opponent-selected image.

It should be noted that, in the right subarea 402R, the setting values of the opponent are not displayed, and a question mark "?" is displayed instead. Therefore, the user needs to determine the order of the image processing parameters to be used for the game by guessing the image processing parameters of the opponent-selected image based on the thumbnail image displayed in the subarea 401R.

In the operation guide area 404, the MENU mark 404a and the OK mark 404b are displayed (see FIG. 11). On the right-hand side of the MENU mark 404a, a return mark (arrow) is displayed. If the user depresses the MENU button 96 (S204: YES), the camera 1 transmits that the game is cancelled to the sub station (S205), and the base station mode process shown in FIG. 10 is terminated. It is noted that, in S204, whether the MENU button 96 is depressed or the OK button 95 is depressed is judged. Therefore, if none of the MENU button 96 and the OK button 95 is operated, the process stays at S204. When the process stays in S204, it is possible to determine the order of the image processing parameters as in S203.

In S206, the camera 1 judges whether a notification of cancellation of the game has been received from the sub station. It is noted that, whether the notification of cancellation of the game is transmitted from the sub station is checked in an interruption process which is repeatedly executed separate from the main process, and in S206, the whether the notification has been received in the interruption process is judged.

If the notification of cancellation of the game has been received from the sub station (S206: YES), the base station mode process is terminated. When the base station mode process is terminated, the process returns to S101, and the game preparation screen P4 is switched to the main screen P2.

When the game preparation screen P4 is displayed, one of the subareas 402La, 402Lb and 402Lc is highlighted as shown in FIGS. 11 and 11A-11E. The user can change the highlighted subarea by operating the up key 94a or down key 94b. For example, when the subarea 402La is highlighted (FIG. 8A), if the user operates the down key 94b, the highlighted subarea is switched from 402La to 402Lb (FIG. 8B).

On the right-hand side of the OK mark 404b, a test "SELECT" is displayed. By depressing the OK button 95 after selecting the highlighted subareas, the user can sequentially select the parameters indicated in the highlighted subareas as the parameters to be used for the game.

How the user can determine the order of the image processing parameters user for the game will be described in detail. At a stage where the game preparation screen P4 is displayed as shown in FIG. 11B, the order of the image processing parameters to be used for the game has not been determined. If the user depresses the OK button 95 when the game preparation screen P4 is displayed as shown in FIG. 11B, the "hue" which corresponds to the highlighted subarea 402Lb is selected to be used for the first match of the game. After the OK button 95 is depressed, the screen P4 as shown in FIG. 11B is switch to the screen P4 shown in FIG. 11C. As shown in FIG. 11, a number "1" is displayed in the subarea 402Lb to indicate that the parameter corresponding to the subarea 402Lb is used for the first match of the game.

Figure 11D:
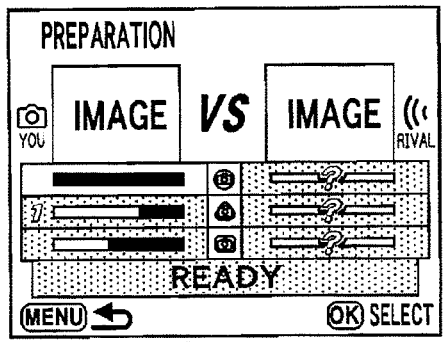
Figure 11B:
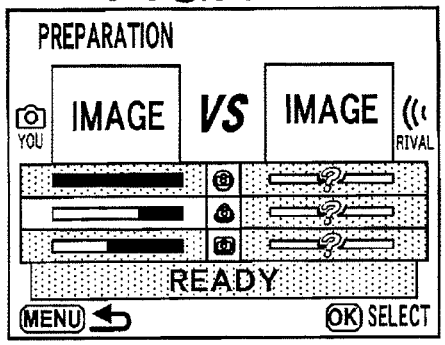
Figure 11E:
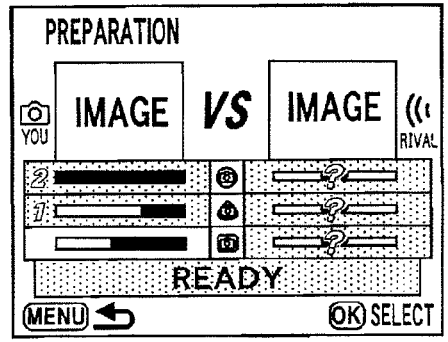
Figure 11C:
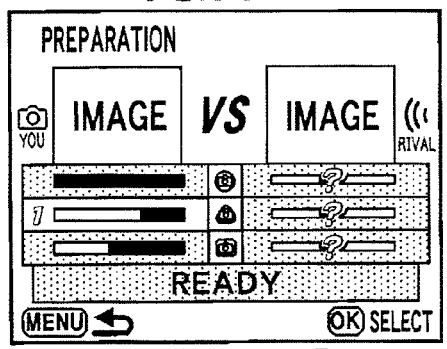
Figure 11F:
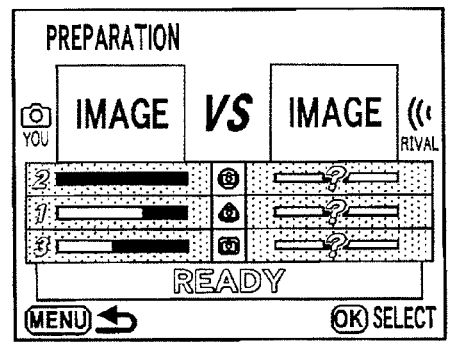

If the user operates the up key 94a when the preparation screen P4 is as shown in FIG. 11C, the highlighted subarea is switched from 402Lb to 402La (FIG. 11D). If the user depresses the OK button 95, the "saturation" corresponding to the subarea 402La is selected as the parameter to be used for the second match of the game. Further, a number "2" is indicated in the subarea 402La to indicated the second match. When the parameters for the first and second matches are determined as above, the highlighted subarea is automatically switched from 402La to 402Lc (FIG. 11E). Further, the parameter for the third match is automatically determined to be the parameter corresponding to the subarea 402Lc, i.e., "contrast" and the highlighted area is switched to 402Lc to 403, which indicates that the camera 1 is ready for the game (see FIG. 11F). If the user depresses the OK button 95 at this stage, the order of the parameters to be used is confirmed, and the screen is switched to a "Game Start" screen P5a as shown in FIG. 12A.

If the order of the image processing parameters are determined and the game is started without cancellation of the game (S204: NO, S206: NO), the camera 1 transmits a notification indicating the preparation has been completed to the sub station via the infrared communication (S207). Then, the camera 1 receives the parameters to be used for the game and the order of the parameters to be used (S208).

In S209, the camera 1 calculates the scores of the main station and the sub station in accordance with the calculation method described above, and judges the winner and a loser (S209). In S210, the camera 1 transmits the result of calculation of the scores and win/lose information to the sub station (S210). Next, the camera 1 stores the result in the recording unit 70. Specifically, the camera 1 updates the accumulated scores indicating the accumulated numbers of win/lose/draw in the accumulated score section 70a of the recording unit 70 (S211). Thereafter, the camera 1 displays the score (S212) and terminates the base station mode process shown in FIG. 10.

Figure 12A:
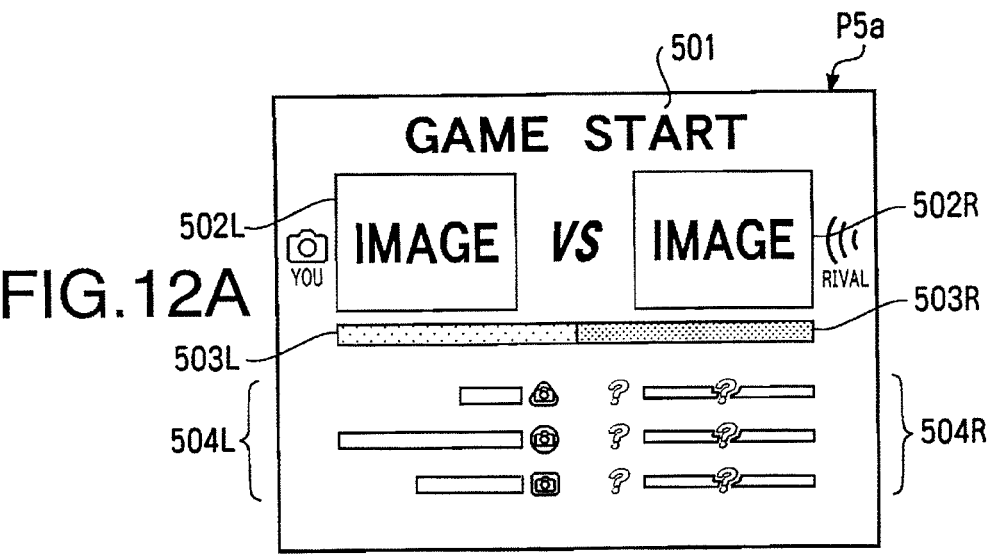
FIGS. 12A-12C show match screens displayed on the display module of the camera.
Figure 12B:
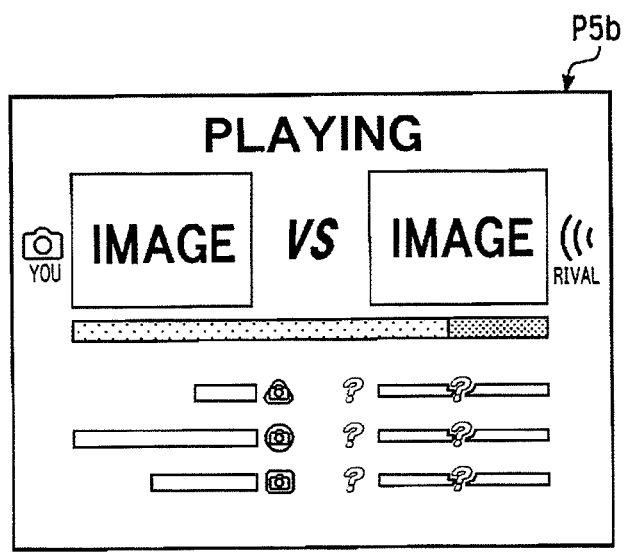
Figure 12C:
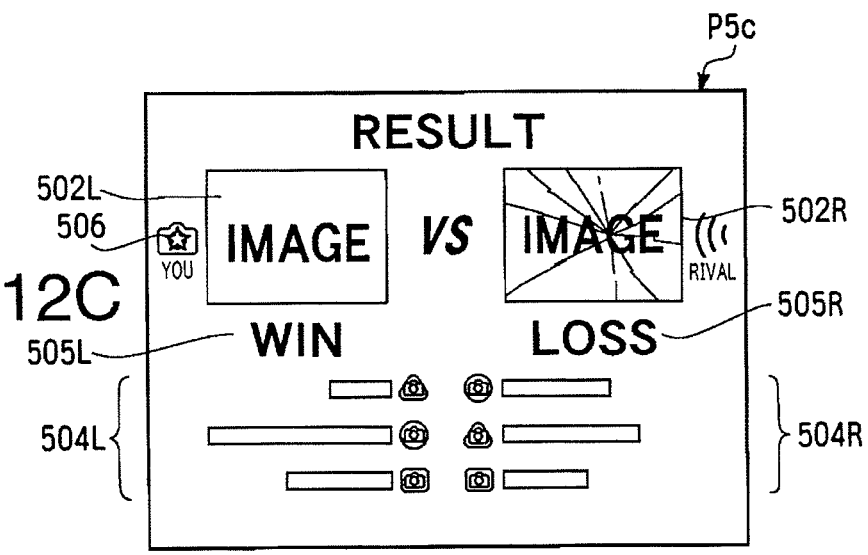

Next, referring to FIGS. 12A-12C, a playing screen which is displayed after the order of the parameters has been determined. The playing screen changes, depending on a degree of progression of the game, a "Start" screen P5a, a "Playing" screen P5b and a "Result" screen P5c respectively shown in FIGS. 12A, 12B and 12C. The "Start" screen (FIG. 12A) P5a is displayed immediately after the game is started for a predetermined period (e.g., one second). The "Playing" screen P5b is displayed after the "Start" screen P5a is extinguished and before the result is displayed. Specifically, the "Start" screen P5a is displayed when steps S204 to S211 are executed. The "Result" screen P5c is displayed on S212 is executed.

The "Start" screen P5a shown in FIG. 12A includes a status display area 501, selected image display areas 502L and 502R, slide bar display areas 503L and 503R, parameter display areas 504L and 504R. In the left-side image display area 502L, the user-selected image is displayed, while in the right-side image display area 502R, the opponent-selected image is displayed. In the left-side parameter display area 504L, the image processing parameters used for processing the user-selected image are displayed in the form of a bar graph, while in the right-side parameter display area 504R, bar graphs corresponding to the parameters used for processing the opponent-selected image are displayed. As in the game preparation screen P4, in the right-side parameter display area 504R, the actual parameters are not displayed, and a question mark "?" is displayed instead.

The slide bar display areas 503L and 503R are indicated with different colors. According to the embodiment, the bar display area 503L is displayed in red, while the bar display area 503R is displayed in blue. The length of each of the display areas 503L and 503R represents the obtained points of the user and opponent, respectively. In the "Start" screen P5a, in order to show fairness, the right and left bars respectively shown in the bar display areas 503R and 503L have the same length. It is noted that, according to the embodiment, the bar display areas 503R and 503L are for displaying animated image of the bars to provide the user and opponents with elation in playing the game, and are not configured to reflect the actually calculated points.

The "Playing" screen P5b is similar to the "Start" screen P5a except that the indication in the status display area 501 is changed to "Playing", and displaying status of the image display areas 502L and 502R, and the slide bar display areas 503L and 503R is changed. Specifically, in the "Playing" screen P5b, in order to provide dynamic feel of the user, a dynamic display is employed for the image display areas 502L and 502R, and the slide bar display areas 503L and 503R. For example, in the image display areas 502L and 502R, the size of the thumbnails may be varied in accordance with variation of the score. It should be noted that the changing amount of the size, when size of the thumbnails is varied, the changing amount does not need to correspond to the actually calculated points. Optionally or alternatively, the positions of the thumbnails and/or inclination of the thumbnails may be changed. Further alternatively, the shape of the thumbnails may be changed. In the "Playing" screen P5b, the length of each of the slide bars displayed in the slide bar display areas 503L and 503R imitates change of the score and changes randomly. That is, the length of the colored bars vary. Optionally, the change of the lengths of the right and left color bars associate with the change of the sizes of the thumbnail images displayed in the image display areas 502R and 502L, respectively.

In the score display screen P5c (FIG. 12C), instead of the slide bar display areas 503L and 503R, right and left win/loss display areas 505R and 505L are arranged. FIG. 12C shows an exemplary case where the user (not the opponent) wins the game. According to the embodiment, on the left-hand side of the image display area 502L and on the right-hand side of the image display area 502R, text "YOU" and "RIVAL" and icons are displayed to indicate the relationship between the images and the user/opponent. As shown in FIG. 12C, in order to notify that the user wins the game, a star mark 506 is overlapped on the icon representing the user ("YOU" in FIG. 12C). If the opponent wins the game, the star mark will be overlapped on the icon representing the opponent ("RIVAL" in FIG. 12C). Further, in order to show that the opponent has lost the game, an image of a crack is overlapped on the thumbnail image of the opponent displayed in the image display area 502R. It is noted that if the game is drawn, the star mark or the image of the crack is not overlapped. After a predetermined period of displaying the Result screen P5c, the base station mode process is terminated, the process returns to S100 and the main screen P2 is displayed on the first display unit 82a.

Figure 13:
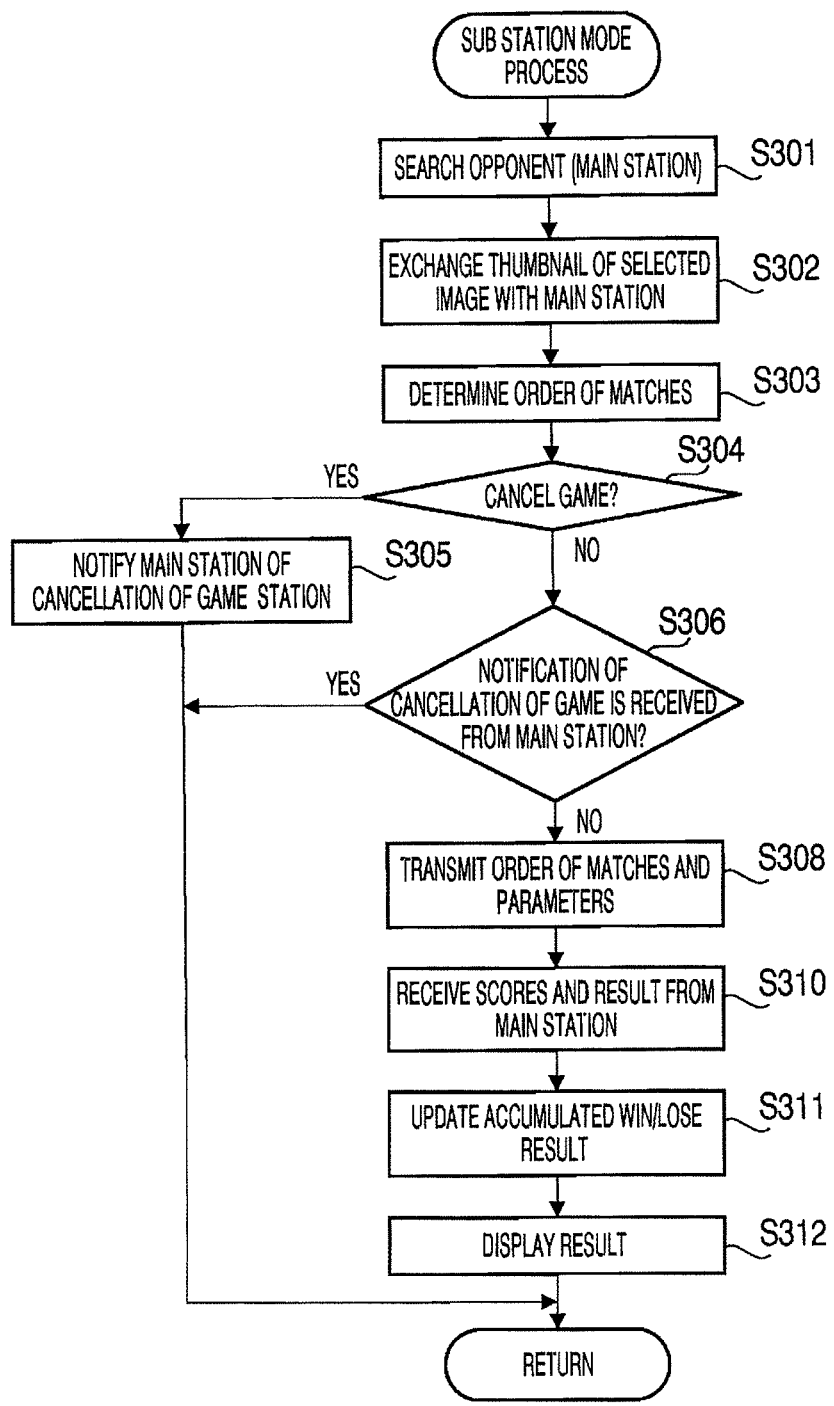
FIG. 13 is a flowchart illustrating a sub station mode process which is called in the main process shown in FIG. 7.

FIG. 13 is a flowchart illustrating the sub station mode process which is called in S300 of the main process. In the sub station mode process, steps S301-S306 are substantially the same as steps S201-S206 of the base station mode process, and description will not be repeated for brevity. Various screens displayed in the sub station mode process are similar to those when the base station mode process is executed, and operations of the user are also the same.

In S303, if the game is not cancelled and the order to the image processing parameters to be used for the game is determined (S304: NO, S306: NO), the order of the image processing parameters determined in S303, and data of the parameters used for calculating the score are transmitted with the infrared communication to the base station (S308). It should be noted that, according to the embodiment, the sub station does not calculate the score. The score of the sub station is also calculated by the base station (see S209 of FIG. 10). In S310, the sub station receives the calculated points and the resultant score from the base station (S310). Next, the camera 1 (sub station) updates the accumulated win/loss numbers (the numbers of win, loss and draw) stored in the recording unit 70 (S311), and display the score (S312). Then, the sub station mode process is terminated.

It should be appreciated that the invention does not need to be limited to the configuration of the above-described exemplary embodiment, and can be modified without departing from the scope of the invention.

In the exemplary embodiment, the game is played between two users (cameras) to determine winner and loser, using two cameras 1. However, it is possible to perform another game using only one camera 1 (and one user) to compete for the self-record. When such a one-person game, the process is similar to the base station mode process shown in FIG. 10 except that steps S201, S202, S205-S208 and S210 are omitted. In this case, in S209, only the score of the user's camera 1 is calculated. When such a one-person game is performed, the game preparation screen P4 (FIG. 11), the Playing screen P5 (FIG. 12B), the selected image display areas 401R, 502R, the parameter display areas 402R, 502R are not displayed. Further, in the one-person game described above, in the score screen, the scores of the top ten games, the dates of the games, the thumbnail images used for the games, the highest score, the lowest score, the average score, the score of the present game, a career order and the like may be displayed. By viewing the score display screen, the image which tends to obtain the high score may be found.

In the one-person game, the opponent is also the user, the strength are the same, and the scoring levels are antagonistic to each other, therefore the user can continue the game without being bored. Further, by repeating the one-person game, the user can realize the photographing conditions and/or image processing conditions with which the high score can be obtained. The user may set the bonuses such that a high bonus given if the photographing/image processing conditions are defined to improve the photographing technique of the user. Configured as above, the user may repeatedly execute the one-person game, which improves the photographing technique of the user. If the bonus setting is configured such that the more the functions the user uses, the higher bonus the user obtains. Then, the user may try to use as many functions as possible, which improves the user's technique. Furthermore, since the user repeatedly executes the photographing operation, the user's attachment to the camera is also strengthened. Still further, since the user obtains the higher skill of using the camera 1 by executing the one-person game, the user becomes stronger in the two-person game, and have a feeling of proud and pleasure in having the camera 1 which obtains the high score in playing the games.

In the one-person game, an imaginary opponent is considered based on the game the user performed in the past (e.g., when the user obtained the highest score), and the data (i.e., the image and the parameters) may be displayed in the selected image display areas 401R, 501R and parameter display areas 402R and 502R. With such a configuration, the user can enjoy the game since the difficulty level of the game is appropriate and the user feels as if the two-person game is being played.

In the above-described embodiment, the final score is obtained by adding the bonus scores to the basic score that is calculated based on the normal random number. However, the bonus scores may be treated in a different way. For example, the bonus score may be added to an average value defining the normal random number (which is determined based on the growth curve and the total number of photographed images), and then, the normal random number based as obtained may be regarded as the final score. In this case, the result (win/loss) of the game is the same as in the exemplary embodiment. Alternatively, the bonus score may be added to the total number of photographed images. In this case, the effect of the bonus scores become non-linear due to effect of the growth curve, and further variation can be made in calculating the final score.

According to the embodiment, the normal random number is used to calculate the score. Such a configuration can be modified, and uniform random numbers may be used instead of the normal random numbers.

In the above-described embodiment, the intrinsic information of the cameras and thumbnail images of the selected images are exchanged using the infrared communication. However, data exchange may be performed in a different way. That is, data exchange can be done using Bluetooth®, wireless communication (e.g., wireless LAN), wired/connected communication method such as one using a USB (universal serial bus). Further, in the embodiment, the thumbnail images of the selected images are exchanged, but the image files themselves may be exchanged instead of the thumbnail images.

In the exemplary embodiment, before the selection and determination of the order of the image processing parameters to be used (S204), the thumbnail images are exchanged (S203). When S203 or S204 is executed, the parameters to be used for calculating the score may be transmitted partially or completely. In such a case, the parameters may be transmitted as separate data which is different from the thumbnail image. Alternatively, the parameters may be included in the thumbnail image (image file) as meta data, and transmitted from the sub station to the base station. In the main station, the camera-intrinsic information that is intrinsic to the sub station and image processing parameters are derived from the received thumbnail image.

In the exemplary embodiment, the accumulated score is stored in the recording unit 70. It may be modified such that detailed information for each game (e.g., date of the game, ID information of the opponent, win/loss information, the file number of the file used for the game, values of the parameters used for the game, the order of the image processing parameters for the game) is stored in the recording unit 70, and the result of each match is additionally stored in the score recoding data base after each match is finished.

In the exemplar embodiment, as the image processing parameters, the saturation, the hue and the contrast are used for defining the standard deviation for the normal random numbers. The invention should not be limited to used the above three kinds of image processing parameters, but other kinds of image processing parameters may be optionally or alternatively used. For example, the white balance, key (brightness) and/or sharpness may be used. In the exemplary embodiment, the game includes three matches using three kinds of image processing parameters, respectively. However, the game needs not be limited to the three-match game, but, for example, single match game or five-match game can be done. Alternatively, the number of match may be changed to an even number. That is, for example, a two-match game may be performed.

In the exemplary embodiment, win/loss is determined based on the file generating conditions (photographing condition and image processing conditions). However, the invention should not be limited to such a configuration, and can be modified in various way. For example, a well-known predetermined image analysis is applied to the selected image file, and based on the obtained analysis data (e.g., change of the brightness or color in the image), and a part of the score may be determined. Alternatively, the entire score is determined based on the analysis data (that is, the score is determined based on the image file).

The above-described embodiment is merely an example in which the present invention is applied to a digital SLR camera. However, the invention may be applied to devices which do not have the photographing function. For example, the invention may be applied to a mobile information processing device such as a cell phone of mobile game device configured to store image data created by an photographing apparatus such as the digital camera. The present invention can also be applied to an information processing device which is configured to connect with a network such as the Internet and obtain the image data through the network. In such a case, for example, the image data generated by the digital camera is stored in a server, the a mobile information processing terminal such as a smart phone capable of accessing the Internet downloads the image data from the server, and use the thus downloaded image data for the game.

This application claims priority of Japanese Patent Application No. P2010-200391, filed on Sep. 7, 2010. The entire subject matter of the applications is incorporated herein by reference.

What is claims is:

1. A photographing device having a game function which determines a win/loss of photographing devices based on information regarding image files, comprising:
    a processor that is configured to:
    obtain a first parameter regarding a first image file which was generated by the photographing device, the first parameter including information intrinsic to the photographing device;
    obtain a second parameter regarding a second image file which is stored in an other device, the second parameter including information intrinsic to a second photographing device;
    calculate scores regarding the first image file and the second image file based on the first parameter including information intrinsic to the photographing device, and the second parameter including information intrinsic to the second photographing device, respectively; and
    determine win/loss of the photographing device and a the second photographing device that generated the second image file, and to generate win/loss information;
    a storage configured to store the win/loss information, in an accumulated manner, as intrinsic information which is intrinsic to the photographing device; and
    a notifier configured to output the accumulated win/loss information.

2. The photographing device according to claim 1, wherein the storage stores the win/loss information in a memory which is provided to an electronic circuit accommodated in the photographing device.

3. The photographing device according to claim 1,
wherein each of the first image file and the second image file includes image data and generating condition data representing conditions when the image data was generated,
wherein the first parameter includes a first obtained generating condition of the first image file as the first parameter, and
wherein the second parameter includes a second obtained generating condition of the second image file as the second parameter.

4. The photographing device according to claim 3, wherein the second generating condition of the second image file is obtained from the other photographing device using a wireless communication unit.

5. The photographing device according to claim 4, wherein the wireless communication unit comprises a communicator disposed to an electronic circuit accommodated in the photographing device.

6. The photographing device according to claim 3,
wherein the generating condition of the image file includes:
a photographing condition representing a condition when the image file was photographed; and
an image processing condition representing a condition when the photographed image was processed.

7. The photographing device according to claim 6, wherein the photographing condition includes a total number of photographed images.

8. The photographing device according to claim 6, wherein the image processing condition includes at least one of saturation, hue and contrast which are image processing parameters defining the image processing to be applied to the photographed image data.

9. The photographing device according to claim 1, the processor being further configured to:
obtain the first image file; and
obtain the second image file; and
the photographing device further comprising an image display that displays an image based on the first image file and the second image file side by side.

10. The photographing device according to claim 9, wherein the processor is further configured to extract a generating condition which has been recorded as meta-information in the obtained image file, at least one of the first parameter and the second parameter include the extracted generating condition.

11. The photographing device according to claim 1, wherein the win/loss information includes accumulated numbers of wins, losses and draws regarding the win/loss of the photographing device with respect to the second photographing device.

12. The photographing device according to claim 1, wherein the storage is configured to store the win/loss information in association with identifying information of the photographing device.

13. A photographing device having a game function which determines win/loss of photographing devices based on information regarding image files, comprising:
a processor that is configured to:
transmit a first parameter regarding a first image file which was generated by the photographing device, the first parameter including information intrinsic to the photographing device;
receive a second image file which is stored in an other device;
receive win/loss information representing win/loss of the photographing device with respect to a second photographing device that generated the second image file, the win/loss information being determined by and transmitted from the other device;
a storage configured to store the win/loss information, in accumulated manner, as intrinsic information which is intrinsic to the photographing device; and
a notifier configured to output the accumulated win/loss information.

14. A method of executing a game to determine win/loss of a plurality of photographing devices based on image files generated by the photographing devices, comprising:
collecting parameters of image files respectively designated by the plurality of photographing devices, the parameters including information intrinsic to each of the plurality of photographing devices;
exchanging image data of the image files designated by the plurality of photographing devices, among the plurality of photographing devices;
determining, by a processor, win/loss of the game based upon the image files related to the collected parameters including information intrinsic to each of the plurality of photographing devices;
increasing a number of wins in the game for the photographing device that generated the determined winning image file, while increasing a number of losses in the game for the photographing device that generated the determined losing image file; and
wherein each of the photographing devices records numbers of wins and losses in an accumulated manner.

15. The method according to claim 14, wherein exchange of the image data is executed using thumbnail image data.

* * * * *